UNITED STATES PATENT OFFICE.

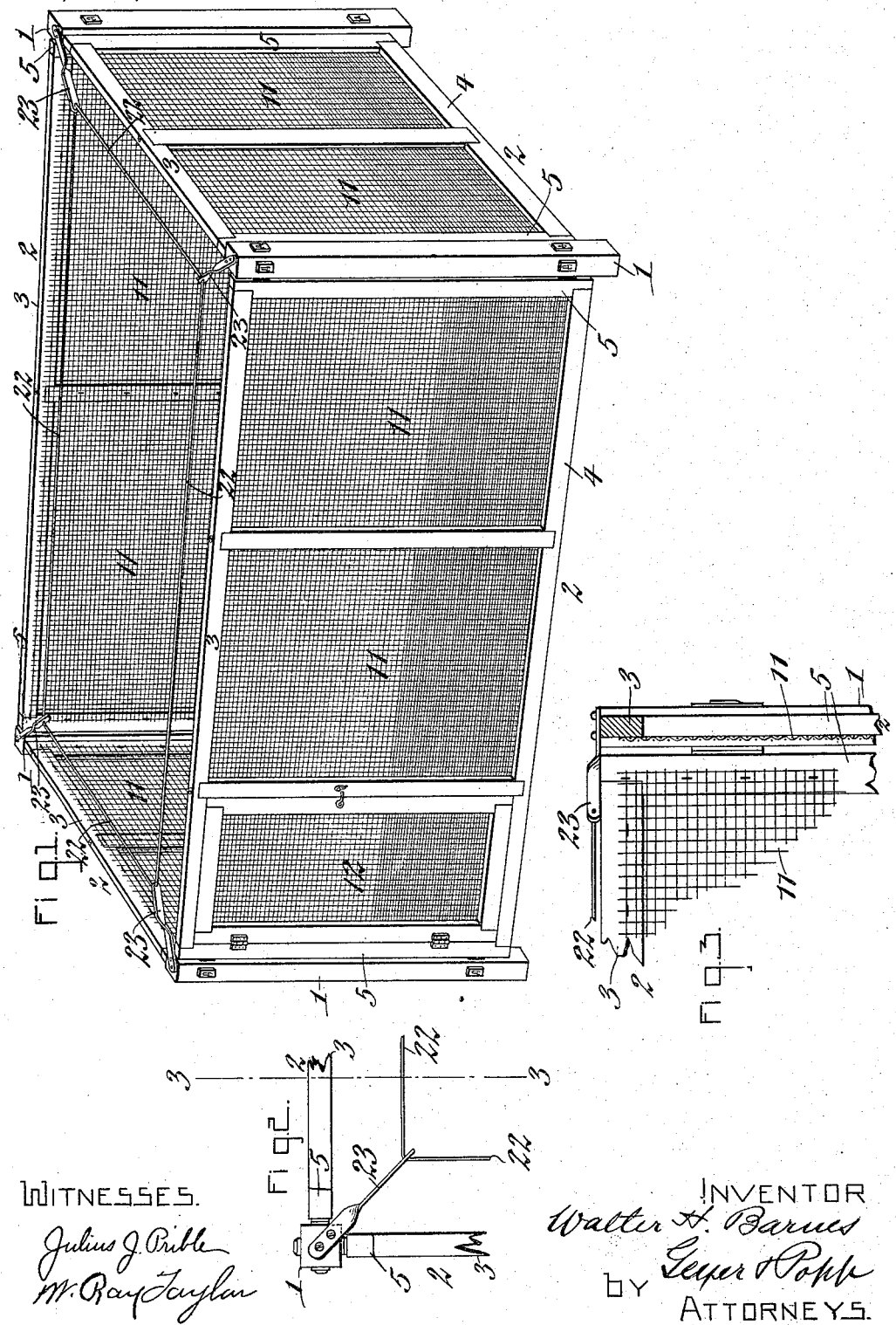

WALTER H. BARNES, OF BUFFALO, NEW YORK.

POULTRY-RUN.

1,170,794. Specification of Letters Patent. Patented Feb. 8, 1916.

Original application filed June 9, 1914, Serial No. 843,996. Divided and this application filed April 21, 1915. Serial No. 22,807.

*To all whom it may concern:*

Be it known that I, WALTER H. BARNES, a citizen of the United States, residing at Buffalo, in the county of Erie and State of New York, have invented new and useful Improvements in Poultry-Runs, of which the following is a specification.

This invention relates to a poultry run or inclosure whereby chickens or the like may be confined within a certain area of ground and more particularly to a poultry run of this character which may be readily knocked down or dismembered and set up or re-assembled so that the same may be conveniently transported from place to place.

It is the object of this invention to provide a poultry run of this character with simple and efficient means for preventing the poultry from flying over the walls and thus avoid the necessity of making the latter unduly high.

This application is a division of an application filed by myself June 9, 1914, Serial No. 843,996.

In the accompanying drawings: Figure 1 is a perspective view of a poultry run embodying my improvements. Fig. 2 is a top plan view of one corner thereof. Fig. 3 is a vertical section taken in line 3—3, Fig. 2.

Similar characters of reference indicate corresponding parts throughout the several views.

In its general organization the poultry run comprises a plurality of upright corner posts 1 and a plurality of upright walls 2 which are detachably connected at their vertical edges with said posts. Each of these posts is adapted to rest with its lower end on the ground and is preferably constructed of wood so that it is of rectangular form in horizontal section and presents four vertical sides. Each of the walls comprises upper and lower horizontal bars 3, 4 and upright end bars 5 which are preferably constructed of wood and detachably connected at their corresponding ends.

The openings formed by the spaces inclosed by the several upright and horizontal bars of each wall may be covered in any suitable manner but preferably by a panel 11 of woven wire of comparatively coarse mesh which is secured to the inner side of the bars. One of the openings of one of the walls preferably contains a door 12, thereby affording means of access to the interior of the run.

In order to avoid making the walls and posts of the poultry run unduly high means are provided for preventing the poultry from flying out of the open top of the space inclosed by the walls and posts adjacent to the upper parts of these walls and posts. The preferred means for this purpose comprises a horizontal guard line or wire 22 which is arranged lengthwise adjacent to the upper horizontal edge of each wall and at a distance inwardly therefrom, and a plurality of horizontal brackets or supporting arms 23 which are preferably constructed of metal and each of which is detachably secured at its outer end to the top of one of the posts and projects inwardly over the space within the chicken run at an angle to the adjacent walls and is provided at its inner end with an eye or opening which receives the adjacent part of the guard line or wire and supports the same in the proper position relatively to the walls. As the chickens attempt to fly over the upper edges of the walls the same encounter the guard wires or lines which they do not observe and are thrown back by the same into the poultry run and after the chickens make several attempts in this manner to get out of the run and are as often checked they are soon trained to keep within the confines of the poultry run. These guard wires as well as the woven wire panels of the walls and the door are removed from their supports and rolled up compactly when the poultry run is transported or stowed away.

I claim as my invention:

A poultry run comprising a plurality of posts, a plurality of walls connected with said posts so as to be arranged at an angle relatively to each other, a plurality of supporting arms each secured at its outer end to the upper end of one of said posts and each projecting inwardly therefrom at an angle to both walls on opposite sides of the respective post, and guard lines mounted on the inner ends of said arms.

WALTER H. BARNES.

Copies of this patent may be obtained for five cents each, by addressing the "Commissioner of Patents, Washington, D. C."